Figure 1:
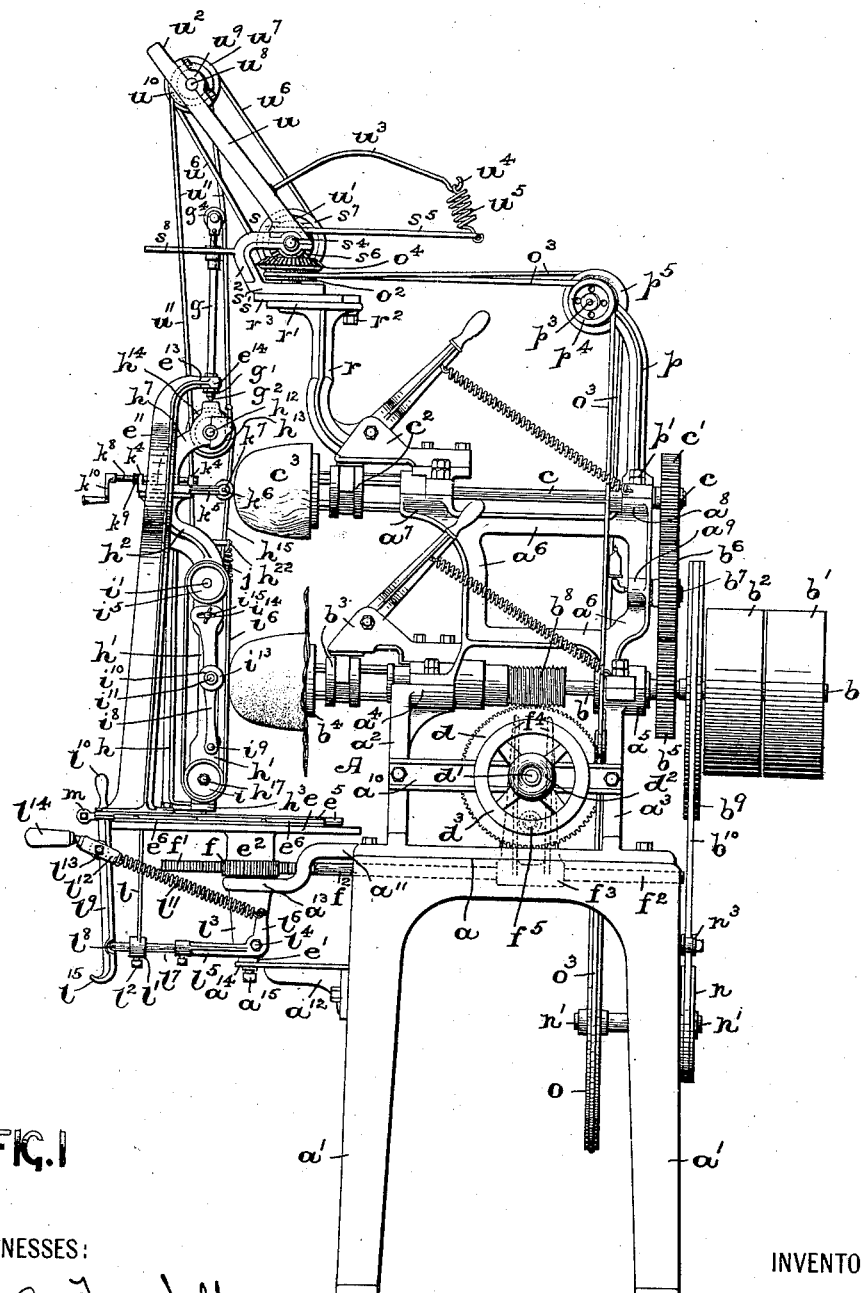

No. 656,294. Patented Aug. 21, 1900.
G. F. LARKIN.
HAT POUNCING MACHINE.
(Application filed Nov. 3, 1899.)

(No Model.) 5 Sheets—Sheet 1.

WITNESSES:

INVENTOR:
GEORGE F. LARKIN,
BY
ATTORNEY

No. 656,294.

G. F. LARKIN.
HAT POUNCING MACHINE.
(Application filed Nov. 3, 1899.)

Patented Aug. 21, 1900.

(No Model.)

5 Sheets—Sheet 2.

WITNESSES:
Marcy Z. Trusdell
Harry Martin

INVENTOR:
GEORGE F. LARKIN,
BY
Fred C. Fraentzel,
ATTORNEY

No. 656,294. Patented Aug. 21, 1900.
G. F. LARKIN.
HAT POUNCING MACHINE.
(Application filed Nov. 3, 1899.)
(No Model.)
5 Sheets—Sheet 3.
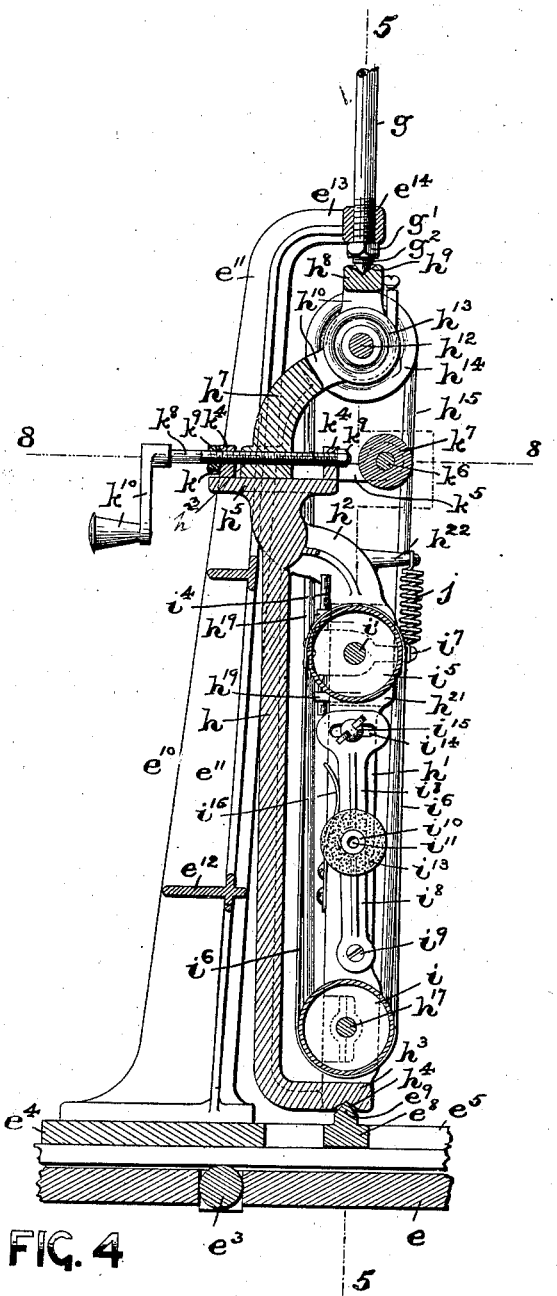
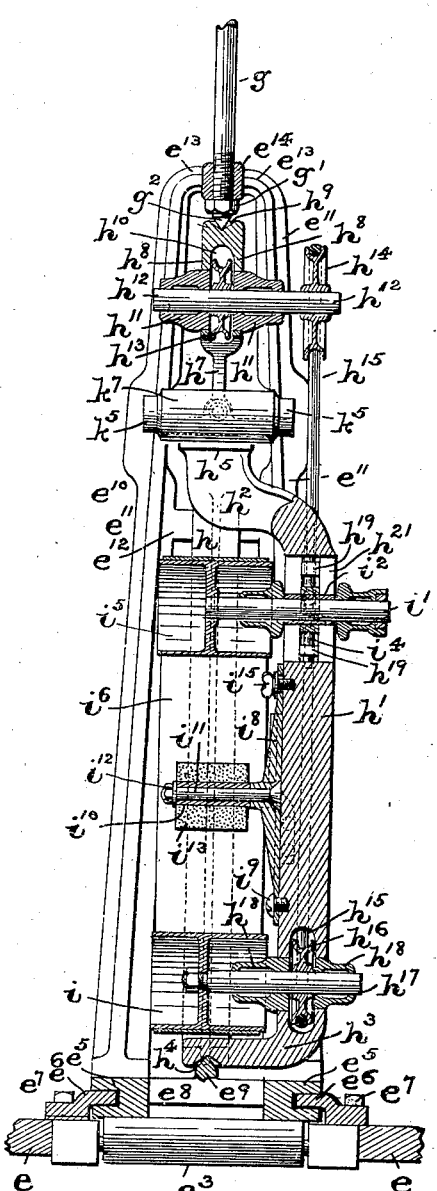
FIG. 4
FIG. 5
WITNESSES:
INVENTOR:
GEORGE F. LARKIN.
BY
Fred C. Fraentzel,
ATTORNEY No. 656,294. Patented Aug. 21, 1900.
G. F. LARKIN.
HAT POUNCING MACHINE.
(Application filed Nov. 3, 1899.)
(No Model.) 5 Sheets—Sheet 4.

WITNESSES:
Marcy T. Trusdell
Harry Martin

INVENTOR:
GEORGE F. LARKIN,
BY
Fred K. Fraentzel,
ATTORNEY

No. 656,294. Patented Aug. 21, 1900.
G. F. LARKIN.
HAT POUNCING MACHINE.
(Application filed Nov. 3, 1899.)

(No Model.) 5 Sheets—Sheet 5.

WITNESSES:
Marcy B. Trusdell
Harry Martin

INVENTOR:
GEORGE F. LARKIN,
BY
Fred L. Fraentzel,
ATTORNEY

UNITED STATES PATENT OFFICE.

GEORGE F. LARKIN, OF NEWARK, NEW JERSEY.

HAT-POUNCING MACHINE.

SPECIFICATION forming part of Letters Patent No. 656,294, dated August 21, 1900.

Application filed November 3, 1899. Serial No. 735,666. (No model.)

*To all whom it may concern:*

Be it known that I, GEORGE F. LARKIN, a citizen of the United States, residing at Newark, in the county of Essex and State of New Jersey, have invented certain new and useful Improvements in Hat-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates, primarily, to improvements in hat-machines, and more particularly to a novel construction of hat-pouncing machine, which may also be employed as a hat-ironing and "luring-off" machine.

The principal object of this invention therefore is to provide a novel construction of machine to be employed for more evenly pouncing hat-bodies upon a hat-block, but also to provide a machine which can be employed for the ironing and luring off of the hat-body.

A further object of this invention is to provide a simple, compact, and effective mechanism for the pouncing of hat-bodies and to provide, in connection with the machine, a means whereby the rotating pouncing-surface presented by the oval or elliptical contour of the hat-block will be constantly brought in even contact with the surface of a moving pouncing-belt and the latter automatically brought in constant and active pouncing engagement with the hat-body upon the pouncing-block, irrespective of the irregular rotating surface of the said block.

A further object of this invention is to provide, in connection with a machine of the character hereinafter fully set forth, a novel means for ironing and luring off the hat-body.

Other objects of this invention not here specifically mentioned will be clearly defined in the accompanying specification.

Heretofore hat-bodies have been pounced by the application of a granular material on a pouncing-roll or a pouncing-belt to which said material is applied and in crown-pouncing to the flat surface of a revolving disk or plate, all of which are brought against the hat-body on the revolving hat-block of the machine by pressure exerted by hand by the attendant of the machine. Several objections are found to exist in the method and mechanism of pouncing hat-bodies, in that the operator in bringing the granular surface of the pouncing mechanism against the hat-body may do so with greater pressure than is actually necessary, thereby causing great heat due to friction, which has a damaging effect upon the hat-body, and if not having entirely ruined the hat-body, giving the same a dingy and dull appearance, or, owing to the hard material of which the pouncing roll or disk is made, the surface of the hat-body will become unevenly pounced and the fiber of the felt torn or pulled out. To overcome these serious objections, an adjustable mechanism has been provided by me whereby the moving pouncing-belt is guided back and forth, according to the uneven surface of the hat-block, against the crown of the same and against its sides, this movement being caused automatically by the action of an oscillating table or platen, on which the pouncing mechanism is placed and mechanism for actuating the said table or platen.

With these several objects in view my present invention therefore consists in the novel construction of machine for pouncing, shearing, or finishing hat-bodies, to be hereinafter fully described; and, furthermore, this invention consists in such novel arrangements and combination of mechanism and the details of the construction thereof, all of which will be clearly described hereinafter, and particularly defined in the clauses of the claim, which form a part of this specification.

The invention is illustrated in the accompanying drawings, in which—

Figure 2:
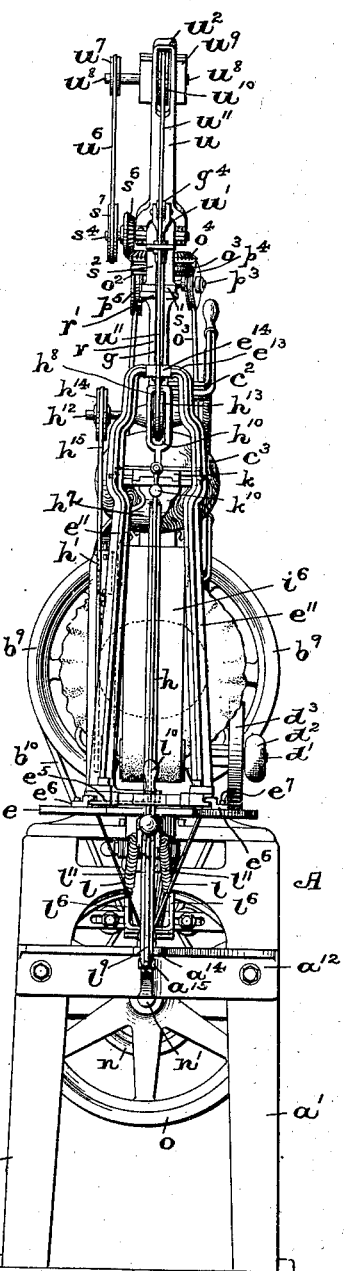

Figure 1 is a side view of a hat-machine embodying the principles of this invention. Fig. 2 is a front elevation, and Fig. 3 a rear elevation, of the machine, said views representing the complete machine. Fig. 4 is a longitudinal vertical section, on an enlarged scale, of a portion of the oscillating table or platen, a movable frame or bracket thereon, and the pouncing-belt and its mechanism, illustrating one manner of pivotally arranging and supporting the pouncing-belt frame in the movable frame or bracket; and Fig. 5 is a vertical cross-section of the parts represented in Fig.

Figure 6:
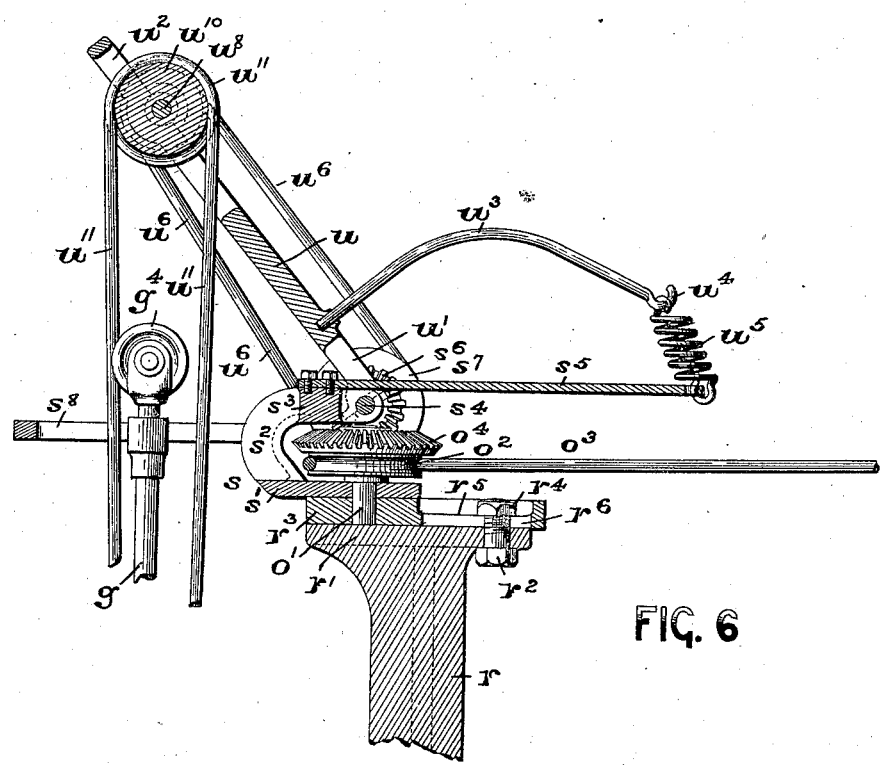
Figure 7:
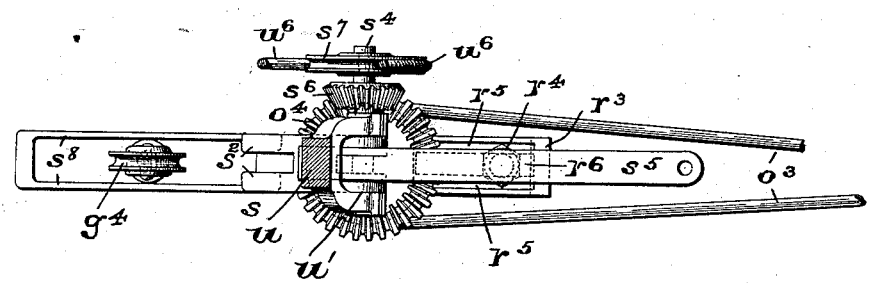
Figure 8:
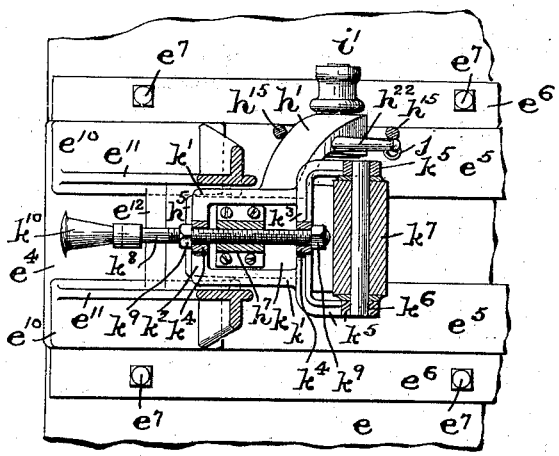
Figure 9:
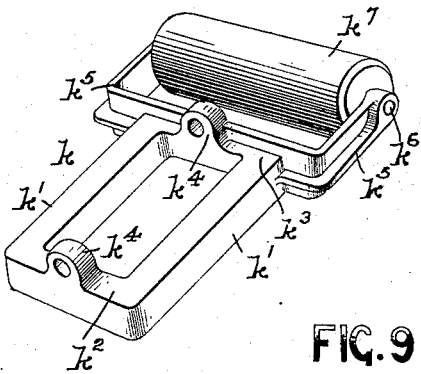
Figure 12:
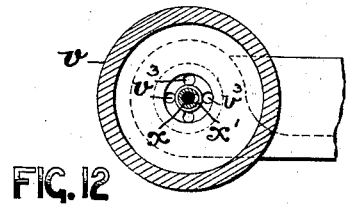
Figure 10:
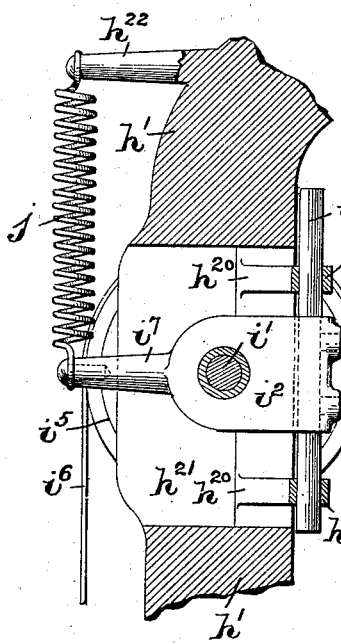
Figure 11:
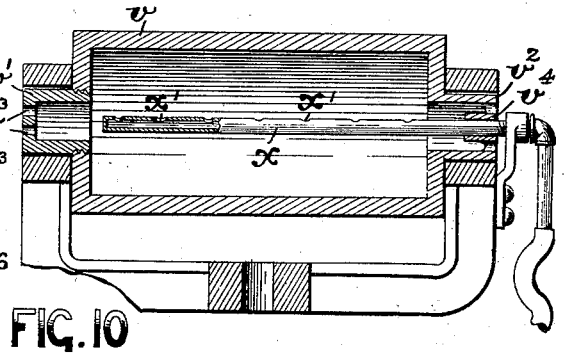

4, said section being taken on line 5 5 in said Fig. 4. Fig. 6 is a detail view of the upper front frame portion of the machine, on an enlarged scale, partly in side elevation and partly in section, and of a gear and belt mechanism for driving the pouncing-belt from the main driving-gear of the machine; and Fig. 7 is a plan or top view of the same. Fig. 8 is a horizontal cross-section taken on line 8 8 in Fig. 4, and Fig. 9 is a perspective view of the guide-roller and its frame represented in said Fig. 8. Fig. 10 is a detail section of a portion of the pouncing-belt frame, illustrating in end elevation the upper roll over which said belt passes and a spring-actuated bearing in which the shaft of said roll is journaled. Fig. 11 is a vertical section, and Fig. 12 a cross-section, respectively, of one preferred form of guide-roller, which can be heated to be used for ironing or luring off the hat-body.

Similar letters of reference are employed in all of the said above-described views to indicate corresponding parts.

In said drawings, A indicates a suitable machine-frame, comprising a suitable table $a$, supported on legs $a'$. The top of said table is preferably constructed with an open top, such as is shown in my previous Letters Patent No. 631,017, of August 15, 1899, on which top is secured in any desired position certain brackets $a^2$ and $a^3$, which are provided with the bearing-boxes $a^4$ and $a^5$. Connected with the upper portions of said bearing-boxes $a^4$ and $a^5$ is a suitably-constructed frame $a^6$, which is provided with the bearing-boxes $a^7$, $a^8$, and $a^9$, substantially as illustrated in Fig. 1. Rotatively arranged in said boxes or bearings $a^4$ and $a^5$ is the driving shaft or spindle $b$, which has a loose pulley $b'$ and a fast pulley $b^2$, arranged thereon at one end for driving the same, and has at its opposite end any suitable form of hat-block chuck $b^3$ for retaining a block $b^4$ in position thereon. The construction of chuck $b^3$ used in the present construction of machine is similar to that set forth in my previous Letters Patent No. 624,225, dated May 2, 1899. The said shaft or spindle $b$ is also provided with a pinion $b^5$, which is in operative mesh with a toothed idler $b^6$, carried by a stud or pin $b^7$, arranged in the bearing-box $a^9$ of the frame $a^6$. In the bearing-boxes $a^7$ and $a^8$ of the frame $a^6$ is rotatively arranged another shaft or spindle $c$, driven from a toothed wheel $c'$ at its own end, which is in mesh with the said idler $b^6$. The said spindle $c$ is provided at its opposite end with any suitable form of hat-block chuck $c^2$ and a dummy-block $c^3$, detachably arranged thereon. In the present construction of machine this chuck $c^2$ and block $c^3$ are the counterparts of the chuck $b^3$ and a block $b^4$ and are made according to my said Patent No. 624,255; but, as has been stated, the two chucks $c^2$ and $b^3$ and the detachable blocks $c^3$ and $b^4$ may be of any other desirable construction. As indicated in Fig. 1 of the drawings, the shaft or spindle $b$ is provided with a suitable worm $b^8$, which is in constant mesh with the teeth of a worm-wheel $d$. Said wheel $d$ is arranged upon a shaft $d'$, rotating in bearing portions in a cross-piece $a^{10}$, connected with the brackets $a^2$ and $a^3$, above mentioned, said shaft $d'$ and wheel $d$ being provided with a clutch mechanism made according to that illustrated and claimed in my said Patent No. 631,017 and being actuated from the said spindle $b$ when two hand-wheels $d^2$ and $d^3$ are screwed tightly down in the manner set forth in said Letters Patent. The frame A of the machine is also provided with a pair of suitable brackets $a^{11}$ and $a^{12}$, which are each provided with a bearing portion $a^{13}$ and $a^{14}$. Rotatively arranged in the bearing portions $a^{13}$ of the bracket $a^{11}$ and suitably supported on the end of an adjusting-screw $a^{15}$ in the portion $a^{14}$ of the bracket $a^{12}$ is a stem or post $e'$ of a suitably-constructed oscillating table or disk $e$, said stem being connected with a hub $e^2$ of said table, and $f$ is a gear-wheel on said stem or post $e'$, arranged in its operative position directly above said bearing $a^{13}$, as clearly illustrated. In order that the said table or disk $e$ may receive an oscillating motion, the said gear-wheel $f$ is made to mesh with the teeth $f'$ of a rod $f^2$, which is slidably arranged beneath the table portion of the machine-frame and is connected, by means of a sleeve $f^3$, with a pair of vertical posts or uprights $f^4$, substantially as indicated in dotted outline in said Fig. 1. Capable of a rotative and a reciprocatory motion between said posts or uprights $f^4$ is a roller or wheel $f^5$, which is mounted on a pin on the worm-wheel $d$, hereinabove mentioned, in the manner set forth in my previous Patent No. 631,017, and causes a reciprocatory sliding motion of the rod $f^2$, when the mechanism of the machine has been set in motion. At the same time the rack portion of said rod $f^2$ will actuate the gear $f$ and cause an oscillating motion of the table or disk $e$. As more clearly indicated in Figs. 4 and 5 of the drawings, the said table or disk $e$ may be provided with one or more rollers $e^3$, which are journaled in a suitable opening or openings in said table, and slidably arranged on said roller or rollers is a bed-plate $e^4$, which is made in the manner of an open frame, having the grooved or slotted longitudinal side pieces $e^5$, which are slidably held in position by means of suitable guides $e^6$, secured in position upon the table or disk by means of screws or bolts $e^7$ or in any other suitable manner. The said open frame is also provided with a cross-piece $e^8$, having a pivot or pointed stud $e^9$, as clearly illustrated.

At or near the forward end the table or disk $e$ is provided with an upwardly-projecting post or support $e^{10}$, which consists, essentially, of two side pieces $e^{11}$ and connecting-braces $e^{12}$, said side pieces being connected at the top, as at $e^{13}$, and having a screw-threaded hub $e^{14}$, substantially as illustrated.

Screwed into the hub and held in its adjusted position by means of a lock-nut $g'$ is a rod $g$, its lower end being preferably made pointed, as at $g^2$. Pivotally supported between said pointed stud $e^9$ and the pointed end $g^2$ of the rod $g$ is a yoke-shaped frame for the pouncing attachment. The said frame is preferably made in two parts, the lower portion of the frame comprising the portions $h$ and $h'$, which are connected, as at $h^2$ and $h^3$, the part $h^3$ having a depression $h^4$ for pivotally supporting it upon the pointed stud $e^9$, hereinabove mentioned. The upper end of the portion $h$ has a flat table-like part $h^5$, on which is secured, by means of screws or bolts $h^6$, a bracket $h^7$, which has a bearing portion $h^8$, provided with a depression $h^9$, into which the pointed end of the rod $g$ extends, as shown. The said bearing portion $h^8$ is provided with an opening $h^{10}$ and has a pair of bearing-boxes $h^{11}$, in which is rotatively arranged a shaft or spindle $h^{12}$, on which is secured a grooved wheel $h^{13}$. The said shaft or spindle $h^{12}$ extends to one side of the main frame directly above the outwardly-extending part $h'$ and is provided with a grooved pulley-wheel $h^{14}$, over which passes a belt $h^{15}$, said belt passing over a second grooved wheel $h^{16}$ on a shaft or spindle $h^{17}$, rotating in bearing-boxes $h^{18}$ in the lower portion of said frame portion $h'$, as clearly illustrated in Fig. 5 of the drawings. Secured to the inwardly-extending end of the lower shaft or spindle $h^{17}$ in any suitable manner is a pulley-wheel $i$ and attached to a shaft or spindle $i'$, rotatively arranged in a bearing device $i^2$, which is secured, by means of screws $i^3$ or in any well-known manner, to a rod $i^4$. Slidably arranged in the bearing portions $h^{19}$ of a pair of arms $h^{20}$ in an opening $h^{21}$ in the frame portion $h'$ is a second pulley-wheel $i^5$. Over this wheel $i^5$ and the lower wheel $i$ I have arranged the pouncing-belt $i^6$, which is provided on its surface with any suitable pouncing material, as will be clearly evident. The shaft or spindle $i'$ has a vibratory motion with its bearings in the opening $h^{21}$, the belt $i^6$ being kept taut by the action of a stout spring $j$, which is arranged between and connects the ends of a post $h^{22}$ on the frame-piece $h'$ and a post $i^7$, extending from the bearing device $i^2$, as will be clearly seen from an inspection of Figs. 4 and 10. As a further precaution to maintain the proper contact of the pouncing-belt with the surface of a hat-body on the block $b^4$ on said spindle $b$, I may secure upon the inner surface of the said frame-piece $h'$ a frame $i^8$, pivotally connected to said frame-piece $h'$ by means of a screw $i^9$ and having a stud $i^{10}$, on which is rotatively retained, by means of a pin $i^{11}$ and nut $i^{12}$, a roller $i^{13}$, made of a soft material, preferably rubber, which can be brought against the inner surface of the pouncing-belt and acts as a support at the point of pouncing contact of said belt with the hat-body upon the block $b^4$ by moving the upper slotted end $i^{14}$ of said frame $i^8$, assisted by the action of a spring $i^{16}$, upon a pin or stud $i^{15}$, which is then tightened or screwed down to hold said parts in their proper and adjusted positions. As will be seen from an inspection of Figs. 4, 5, and 8, I have also arranged upon the flat table-like part $h^5$ of the frame portion $h$, so as to surround the base portion of the bracket $h^7$, an open frame $k$, consisting, essentially, of the side pieces $k'$ and the laterally-arranged connecting-pieces $k^2$ and $k^3$, each of which has a perforated hub $k^4$. The cross-piece $k^3$ has a pair of forwardly-extending arms $k^5$, forming a yoke, provided with perforated ends for the journals $k^6$ of a guide-roller $k^7$. The said guide-roller $k^7$ is adjustable toward or from the block $c^3$ on the spindle $c$ by the turning of a screw-rod $k^8$ in the screw-threaded part $h^{23}$ of the bracket $h^7$, said rod being operatively held in the perforated hub $k^4$ by suitable nuts $k^9$ or any other means when operated by means of a handle $k^{10}$, as will be clearly evident.

Automatic and operative contact between the active surface of the pouncing-belt $i^6$ and the hat-body on the block $b^4$ on the shaft or spindle $b$ during the various positions offered by the revolving hat-block and the oscillating table or disk $e$ is caused by means of a spring-actuated mechanism, which is illustrated in Figs. 1 and 2 of the drawings, and which presses against the end of said bed-plate $e^4$, hereinabove mentioned, and causes it to slide on the rollers of the table or disk $e$ between the guides of said table or disk normally in a direction toward the surface presented by the revolving hat-block $b^4$. This spring mechanism consists, essentially, of a rod $l$, which depends from the lower side of said table or disk $e$, and has a sleeve $l'$ at its free end provided with a set-screw $l^2$. Pivotally connected with a sleeve $l^3$ on the post or stem $e'$ of the disk or table $e$ by means of a pin or stud $l^4$ is a bell-crank consisting of the arms $l^5$ and $l^6$. Adjustably connected with the said arm $l^5$ is a rod $l^7$, which slides in the sleeve $l'$ of the rod $l$. Pivotally connected with the free end of the said rod $l^7$ at $l^8$ is an upwardly-extending arm $l^9$, provided with a handle $l^{10}$, the said arm $l^9$ being slidably arranged between a pair of projections $m$, extending from said bed-plate $e^4$, as illustrated in Fig. 1 of the drawings and as more particularly set forth in my previous Letters Patent No. 631,017. Said lever or rod $l^9$ is thus slidably arranged between the arms of said projection $m$ and can be used by the operator for causing the disengagement of the pouncing mechanism from the hat-body upon the hat-block $b^4$. The said mechanism is, however, normally held against the said hat-block by means of a pair of coiled springs $l^{11}$, which are attached at one end to the free end of the arm $l^6$ of the bell-crank, and at the opposite ends the said springs are connected with a link $l^{12}$, provided with a roller $l^{13}$. Said link $l^{12}$ embraces the upwardly-extending rod or lever $l^7$ and has a handle $l^{14}$, the said springs $l^{11}$ forcing said roller $l^{13}$ into a suitable notch in the rod $l^7$, thereby bringing the proper tension on the springs and maintaining a constant operative contact of the pouncing mechanism, and more especially its pouncing-belt, with the work upon the hat-block $b^4$ against the tension of the distended coils of said springs $l^{11}$. When it is desired to disengage the said pouncing-belt from its contact with the hat-body upon the block to remove the hat-body, the operator takes hold of both handpieces $l^{10}$ and $l^{14}$ of the rod $l^7$ and the link $l^{12}$ and forces the roller $l^{13}$ from its position indicated in said Fig. 1 on said rod $l^7$ down the same until it reaches a stop $l^{15}$ at the lower end of said rod, whereby all tension is removed from the springs $l^{11}$ and the pouncing mechanism can be readily drawn back to an inoperative position upon the table or disk $e$.

Having described the general construction of the main parts of mechanism of the machine, I will now endeavor to describe the operative mechanism for driving the pouncing-belt connected with the frame $h$, hereinabove described.

Figure 3:
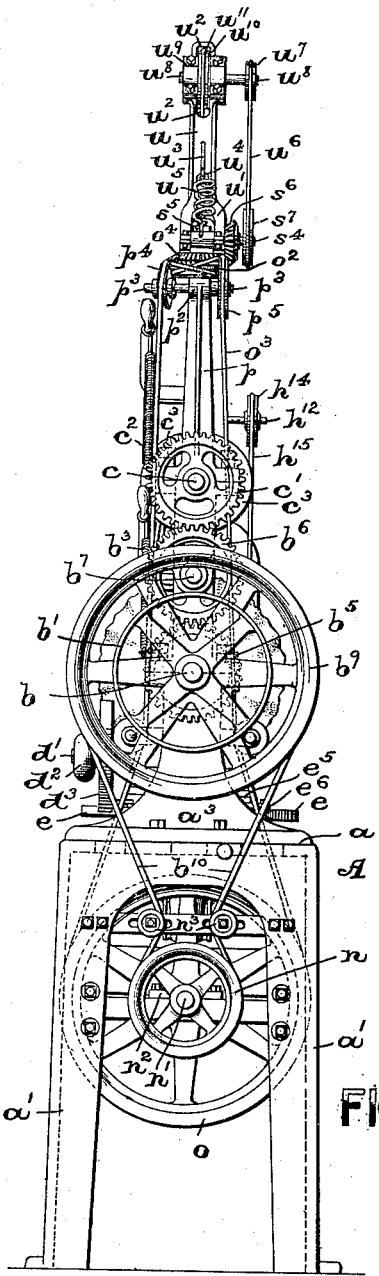

Upon the spindle or shaft $b$ I have secured in any well-known manner a pulley-wheel $b^9$, over which passes a belt $b^{10}$, said belt also passing over a wheel $n$ on a shaft $n'$, rotating in a bearing $n^2$, attached to the machine-frame, as clearly indicated in Figs. 1 and 3 of the drawings. The said belt $b^{10}$ is maintained taut, preferably, by means of a pair of adjustable rollers $n^3$, as indicated in said figures; but said rollers are not absolutely necessary and may be dispensed with, if desired. At the opposite end of said shaft $n'$, by being secured thereon in any well-known manner, is a pulley-wheel $o$. The said machine-frame $a^6$, previously mentioned, has secured thereon by means of bolts $p'$ or in any other well-known manner an upwardly-extending rod or standard $p$, which is provided at its free end with a bearing portion $p^2$ and a horizontal spindle $p^3$ therein, having secured on its opposite ends projecting from said bearing portion $p^2$ a pair of rollers or wheels $p^4$ and $p^5$.

Connected with the framework of the chuck $c^2$ and secured thereto in any suitable manner is an upwardly-extending arm or standard $r$, provided with a flat portion $r'$, upon which is slidably and adjustably secured, by means of a set-screw or bolt $r^2$, a slide $r^3$, the head or nut $r^4$ of said screw or bolt $r^2$ being capable of being tightly screwed down upon shoulders $r^5$, formed adjacent to a longitudinal slot $r^6$ in said slide $r^3$, as clearly illustrated in Figs. 6 and 7. Rotatively arranged upon the said slide $r^3$ in a horizontal plane is a yoke-frame $s$, consisting, essentially, of a body-plate $s'$ and upwardly-extending portion $s^2$ and a cross-piece $s^3$, provided with suitable bearings for a spindle or shaft $s^4$. Said frame $s$ is rotatably arranged on a pin or stud $o'$ in a hole or perforation in the slide $r^3$ (see Fig. 6) and is provided with a grooved wheel portion $o^2$, over which passes a belt $o^3$, said belt $o^3$ being passed over the rollers or wheels $p^4$ and $p^5$ and over the pulley-wheel $o$, from which it derives its power to drive a bevel-wheel $o^4$, secured on said pin or stud $o'$, directly above the wheel $o^2$. Loosely arranged on the ends of said spindle or shaft $s^4$ is an oscillating or vibratory frame $u$, comprising the lower forked end $u'$ and the upper forked end $u^2$. The said frame $u$ is provided with a suitably-bent and backwardly-extending arm $u^3$, having a hook end or loop $u^4$, to which is secured the end of a spring $u^5$, said spring being also connected at its opposite end with an arm or rod $s^5$, fixed to said cross-piece $s^3$ of the yoke-frame $s$ and extending directly between the forked end $u'$ of said frame $u$. This spring $u^5$ and the arms $u^3$ and $s^5$ tend to hold the said frame $u$ normally in the positions indicated in Figs. 1, 2, 3, and 6, but permits of any distortion of the belt connection when the machine is in operation, as will be hereinafter presently described.

Upon the spindle or shaft $s^4$ I have arranged a bevel-gear $s^6$, which is in active mesh with the teeth of the bevel-gear $o^4$ on the pin or stud $o'$ to drive said spindle or shaft $s^4$ and a grooved wheel $s^7$ on the free end of said shaft or spindle. Over this wheel $s^7$ I have passed a belt $u^6$, which passes over a grooved wheel $u^7$ on a spindle $u^8$, rotating in suitable bearings $u^9$, connected with the upper forked end $u^2$ of the frame $u$. Upon said shaft or spindle $u^8$ and directly in the forked portion $u^2$ of said frame $u$ is a grooved wheel $u^{10}$, over which passes a belt $u^{11}$, said belt passing directly over a grooved driving wheel or pulley $h^{13}$, secured upon the shaft or spindle $h^{12}$ of the pivotally-arranged frame with which the pouncing mechanism is connected. The rod $g$, previously mentioned, extends upwardly between a slotted guide-arm $s^8$ (see Figs. 1, 6, and 7) and has a grooved wheel $g^4$, which maintains the proper tautness of said belt $u^{11}$ during the backward and forward motions of the pouncing attachment and is oscillatory, caused by the motion of the plate or disk $e$ and its pivotal motion between the respective pivots of the stud $e^9$ and rod $g$. It will thus be evident from the above description that the pouncing-belt can properly operate upon the hat-body upon the block $b^4$, the various belts and the oscillating and vibratory frame $u$ adapting themselves readily to the various positions of the pouncing-belt and the mechanism with which it is connected, due to the varying surfaces presented by the block $b^4$ and the dummy-block $c^3$ during their rotation, and while a rotary motion is imparted to the hat-block on the spindle or shaft $b$ by means of the main driving mechanism and an oscillatory motion in a horizontal plane is imparted to the table or disk $e$ the pouncing-belt, which is constantly held against the hat-body on the rotating block, will move vertically against all surfaces of the hat-body, while the bed-plate $e^4$, on which it is arranged, reciprocates back and forth in the guides of the oscillating disk or table $e$ and limits the motion of the pouncing-belt-operating mechanism in a horizontal plane to the extent of the oscillating motion of the disk or plate $e$, which of course is limited to the throw of the roller $f^5$, actuated by the worm-wheel $d$. As has been previously stated, the guide-roller $k^7$ is adjustable to or from the dummy-block $c^3$, whereby one block $c^3$ may be made to act as a guide for properly bringing the pouncing-belt against the pouncing-surfaces of the pouncing-blocks $b^4$ of different sizes, the shapes of the two blocks of course corresponding, in which case the size of the dummy-block $c^3$ may be the same or smaller or larger than the size of the block $b^4$ and still enable the proper pouncing of the hat-body on the block $b^4$ by the pouncing-belt.

In lieu of the guide-roller $k^7$, hereinabove described, the said roller by means of a slight change in its construction may be employed as an ironing device by placing the pounced hat-body upon the block $c^3$ and running said roller directly over said hat-body by once more setting the machine in operation. This form of combined guide-roller and "ironer" is represented in detail in Figs. 11 and 12, and consists, essentially, of a hollow roller $v$, provided with the bearing portions $v'$ and $v^2$ for properly arranging it in the bearings connected with the framework of the pouncing attachment. The one end of said roller is closed and is provided with one or more holes or perforations $v^3$, and its opposite end is open, having a hub $v^4$, through which I have passed a gas-conveying pipe $x$, provided with the perforations $x'$ for igniting the gas when a lighted match is inserted in the hollow roller $v$, and thereby heating the same.

The operations of the several mechanism hereinabove described are simple and efficient for the various uses set forth in this specification.

I am aware that many changes may be made in the various arrangements and combinations of the mechanism and parts thereof, as well as in the details of the construction of the same, without departing from the scope of my present invention. Hence I do not limit my invention to the exact arrangements and combinations of the various mechanism as herein described and illustrated, nor do I confine myself to the exact details of the construction of the various parts, whether taken collectively or singly.

Having thus described my invention, what I claim is—

1. In a hat-machine, the combination, with a machine-frame, of a pair of horizontal spindles or shafts, and means for rotating the same, a hat-block on one of said spindles, a dummy-block on the other of said spindles, a pouncing mechanism in operative contact with said hat-block, and an oscillating guiding means connected with said pouncing mechanism having a rock motion in a horizontal plane, whereby said guiding means is in operative contact with said dummy-block at the tip and sides of said block, and whereby the pouncing means can be brought in operative contact with the tip and sides of the hat-block, substantially as and for the purposes set forth.

2. In a hat-machine, the combination, with a machine-frame, of a pair of horizontal spindles or shafts, and means for rotating the same, a hat-block on one of said spindles, a dummy-block on the other of said spindles, a pouncing mechanism in operative contact with said hat-block, consisting, essentially, of a standard or support, a pouncing-belt frame pivotally connected with said standard or support, pulley-wheels in said belt-frame, a pouncing-belt on said pulley-wheels, means for operating said pulley-wheels, and a guiding means connected with said pouncing-belt frame in operative contact with said dummy-block, substantially as and for the purposes set forth.

3. In a hat-machine, the combination, with a machine-frame, of a pair of horizontal spindles or shafts, and means for rotating the same, a hat-block on one of said spindles, a dummy-block on the other of said spindles, a pouncing mechanism in operative contact with said hat-block, and a guiding means connected with said pouncing mechanism, consisting, of a frame having bearing portions, and a roller journaled in said bearing portions, in operative contact with said dummy-block, substantially as and for the purposes set forth.

4. In a hat-machine, the combination, with a machine-frame, of a pair of horizontal spindles or shafts, and means for rotating the same, a hat-block on one of said spindles, a dummy-block on the other of said spindles, a pouncing mechanism in operative contact with said hat-block, and a guiding means connected with said pouncing mechanism, consisting, of a frame having bearing portions, slidably and adjustably secured to said pouncing mechanism, a means of adjustment connected therewith, and a roller journaled in said bearing portions in operative contact with said dummy-block, substantially as and for the purposes set forth.

5. In a hat-machine, the combination, with the machine-frame, of a spindle bearing a hat-block, a pouncing mechanism in operative contact with said hat-block, consisting, essentially, of a standard or support, a pouncing-belt frame comprising the frame portions $h$ and $h'$ pivotally supported in said standard, a pair of spindles in said frame portion $h'$, pulley-wheels on said spindles, a pouncing-belt on said pulley-wheels, means for operating the same, one of said spindles and pouncing-belt pulleys being spring-actuated and adjustable in said frame portion $h'$, and means for causing an operative contact of said pouncing-belt with said hat-block, substantially as and for the purposes set forth.

6. The combination, in a hat-machine, with the machine-frame, of a pair of horizontal spindles or shafts, a hat-block on one of said spindles, a dummy-block on the other of said spindles, a pouncing mechanism in operative contact with said hat-block, consisting, essentially, of a standard or support, a pouncing-belt frame comprising the frame portions $h$ and $h'$ pivotally supported in said standard, a pair of spindles in said frame portion $h'$, pulley-wheels on said spindles, a pouncing-belt on said pulley-wheels, means for actuating the same, and a guiding means connected with said frame portion $h$ in operative contact with said dummy-block, substantially as and for the purposes set forth.

7. The combination, in a hat-machine, with the machine-frame, of a pair of horizontal spindles or shafts, a hat-block on one of said spindles, a dummy-block on the other of said spindles, a pouncing mechanism in operative contact with said hat-block, consisting essentially, of a standard or support, a pouncing-belt frame comprising the frame portions $h$ and $h'$ pivotally supported in said standard, a pair of spindles in said frame portion $h'$, pulley-wheels on said spindles, a pouncing-belt on said pulley-wheels, means for actuating the same, one of said spindles and pouncing-belt pulleys being spring-actuated and adjustable in said frame portion $h'$ and a guiding means connected with said portion $h$, in operative contact with said dummy-block, substantially as and for the purposes set forth.

8. In a hat-machine, the combination, with a machine-frame, of a spindle bearing a hat-block, and means for rotating the same, a table or disk oscillating in a horizontal plane, mechanism for operating the same, a reciprocating bed-plate on said table or disk, and a pouncing mechanism, consisting, essentially, of a standard or support arranged on said bed-plate, a pouncing-belt frame pivotally connected with said standard or support, pulley-wheels in said belt-frame, and a pouncing-belt on said pulley-wheels, substantially as and for the purpose set forth.

9. In a hat-machine, the combination, with a machine-frame, of a pair of horizontal spindles or shafts, and means for rotating the same, a hat-block on one of said spindles, and a dummy-block on the other of said spindles, a table or disk oscillating in a horizontal plane, mechanism for operating the same, a reciprocating bed-plate on said table or disk, a pouncing mechanism on said bed-plate, and a guiding means connected with said pouncing mechanism in operative contact with said dummy-block, substantially as and for the purposes set forth.

10. In a hat-machine, the combination, with a machine-frame, of a pair of horizontal spindles or shafts, and means for rotating the same, a hat-block on one of said spindles, and a dummy-block on the other of said spindles, a table or disk oscillating in a horizontal plane, mechanism for operating the same, a reciprocating bed-plate on said table or disk, a pouncing mechanism on said bed-plate, consisting, essentially, of a standard or support, a pouncing-belt frame pivotally connected with said standard or support, a pouncing-frame pivotally connected with said standard or support, pulley-wheels in said belt-frame, a pouncing-belt on said pulley-wheels, means for operating said pulley-wheels, and a guiding means connected with said pouncing-belt frame, in operative contact with said dummy-block, substantially as and for the purposes set forth.

11. In a hat-machine, the combination, with a machine-frame, of a pair of horizontal spindles or shafts, and means for rotating the same, a hat-block on one of said spindles, and a dummy-block on the other of said spindles, a table or disk oscillating in a horizontal plane, mechanism for operating the same, a reciprocating bed-plate on said table or disk, a pouncing mechanism on said bed-plate, and a guiding means connected with said pouncing mechanism, consisting, of a frame having bearing portions, and a roller journaled in said bearing portions in operative contact with said dummy-block, substantially as and for the purposes set forth.

12. In a hat-machine, the combination, with a machine-frame, of a spindle bearing a hat-block, and means for rotating the same, a pouncing mechanism, and means for actuating said pouncing mechanism, comprising, a pulley-wheel connected with said pouncing mechanism, a pulley-wheel operated from the main driving-shaft of the machine, an oscillating and vibrating belt-frame on the said machine-frame, pulley-wheels on said oscillating and vibrating belt-frame, and belt connections, connecting said pulley-wheel operated from the main driving-shaft, and said pulley-wheel of the pouncing mechanism, with the pulley-wheels of said oscillating and vibrating belt-frame, substantially as and for the purposes set forth.

13. In a hat-machine, the combination, with a machine-frame, of a spindle bearing a hat-block, and means for rotating the same, a pouncing mechanism, and means for actuating said pouncing mechanism, comprising a pulley-wheel connected with said pouncing mechanism, a pulley-wheel operated from the main driving-shaft of the machine, a yoke-frame secured to said machine-frame, bearing portions connected with said yoke-frame, a spindle or shaft in said bearing portions, a vibrating belt-frame on said spindle or shaft, pulley-wheels on said vibrating belt-frame, a belt passing over said pulley-wheels, means for driving said spindle or shaft of said vibrating belt-frame from the main driving-shaft of the machine, and a belt connection between said vibrating frame and the pulley-wheel of the pouncing mechanism, substantially as and for the purposes set forth.

14. In a hat-machine, the combination, with a machine-frame, and a support $r$ thereon, of a spindle bearing a hat-block, and means for rotating the same, a pouncing mechanism, and means for actuating said pouncing mechanism, comprising, a pulley-wheel connected with said pouncing mechanism, a pulley-wheel operated from the main driving-shaft of the machine, a yoke-frame pivotally arranged on said support $r$ so as to swing horizontally thereon, a pulley-wheel and miter-gear connected with a plate $r'$ on said support $r$, bearing portions on said yoke-frame, a spindle in said bearing portions, a miter-gear on said spindle in mesh with said miter-gear on said plate $r'$, a vibrating belt-frame on said spindle, pulley-wheels on said vibrating belt-frame, a belt passing over said pulley-wheels, a pulley-wheel $u^{10}$ on said vibrating belt-frame, a belt passing over said pulley-wheel $u^{10}$ and the pulley-wheel connected with said pouncing mechanism, and a belt passing over the pulley actuated from said main driving-shaft and the pulley-wheel connected with said plate $r'$, substantially as and for the purposes set forth.

15. In a combined hat pouncing and ironing machine, a pair of horizontal spindles or shafts, and means for rotating the same, a block $b^4$ on one of said spindles, and a block $c^3$ on the other of said spindles, a pouncing mechanism in operative contact with said hat-block $b^4$, a combined ironing and guide roller connected with said pouncing mechanism in operative contact with said block $c^3$, and means connected with said combined ironing and guide roller for heating the same, substantially as and for the purposes set forth.

16. In a hat-machine, the combination, with a machine-frame, of a pair of horizontal spindles or shafts, and a means for rotating the same, a hat-block on one of said spindles, and a dummy-block on the other of said spindles, a table or disk oscillating in a horizontal plane, mechanism for operating the same, a reciprocating bed-plate on said table or disk, a pouncing mechanism on said bed-plate, a guiding means connected with said pouncing mechanism, consisting, essentially, of a slidably and adjustably arranged frame having a pair of bearing portions, a means of adjustment connected with said frame, and a roller journaled in said bearing portions in operative contact with said dummy-block, substantially as and for the purposes set forth.

17. In a combined hat pouncing and ironing machine, a pair of horizontal shafts or spindles, and means for rotating the same, a block $b^4$ on one of said spindles, and a block $c^3$ on the other of said spindles, a pouncing mechanism in contact with said block $b^4$, a guiding means connected with said pouncing mechanism, consisting, of a frame having bearing portions, a hollow ironing and guide roller journaled in said bearing portions in operative contact with said block $c^3$, and means connected with said combined ironing and guide roller for heating the same, substantially as and for the purposes set forth.

In testimony that I claim the invention set forth above I have hereunto set my hand this 30th day of October, 1899.

GEORGE F. LARKIN.

Witnesses:
FREDK. C. FRAENTZEL,
HARRY MARTIN.